United States Patent [19]

Chyung et al.

[11] Patent Number: 5,652,188

[45] Date of Patent: Jul. 29, 1997

[54] FIBER-REINFORCED COMPOSITE WITH SHEET SILICATE INTERLAYER

[75] Inventors: Kenneth Chyung, Painted Post; Steven B. Dawes, Corning, both of N.Y.

[73] Assignee: Corning Incorporated, Corning, N.Y.

[21] Appl. No.: 287,224

[22] Filed: Aug. 8, 1994

[51] Int. Cl.⁶ ............................... C03C 14/00
[52] U.S. Cl. ...................... 501/32; 501/9; 501/88; 501/95.2
[58] Field of Search ................ 501/9, 32, 95, 501/12, 87, 88, 89

[56] References Cited

U.S. PATENT DOCUMENTS

| | | | |
|---|---|---|---|
| 4,615,987 | 10/1986 | Chyung et al. | 501/8 |
| 4,626,515 | 12/1986 | Chyung et al. | 501/32 |
| 4,935,387 | 6/1990 | Beall et al. | 501/3 |
| 4,948,758 | 8/1990 | Beall et al. | 501/3 |
| 5,132,253 | 7/1992 | Dawes | 501/12 |
| 5,132,256 | 7/1992 | Beall et al. | 501/95 |
| 5,164,341 | 11/1992 | Chyung et al. | 501/8 |
| 5,192,475 | 3/1993 | Tredway | 501/32 X |
| 5,198,302 | 3/1993 | Chyung et al. | 428/375 |
| 5,284,806 | 2/1994 | Gadkaree | 501/32 X |

*Primary Examiner*—Karl Group
*Attorney, Agent, or Firm*—Robert L. Carlson

[57] ABSTRACT

The invention relates to fiber reinforced composite materials, and a method for making, in which ceramic, glass-ceramic or glass matrix precursor particles are coated with a layer of sheet silicate crystals, or precursors for sheet silicate crystals, and then combined with a fiber reinforcement phase disposed within the matrix consisting of amorphous or crystalline inorganic fibers. The method results in a composite material in which a substantially continuous layer of sheet silicate is provided on the matrix particles, resulting in a substantially continuous sheet silicate interface between the inorganic fibers and the ceramic, glass or glass-ceramic matrix.

19 Claims, 2 Drawing Sheets

FIG. 1A
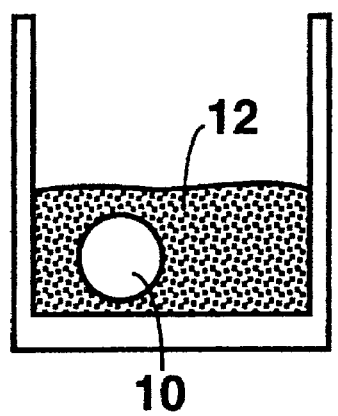
FIG. 1B
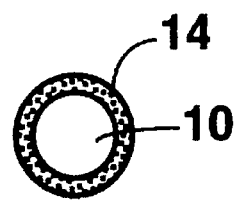
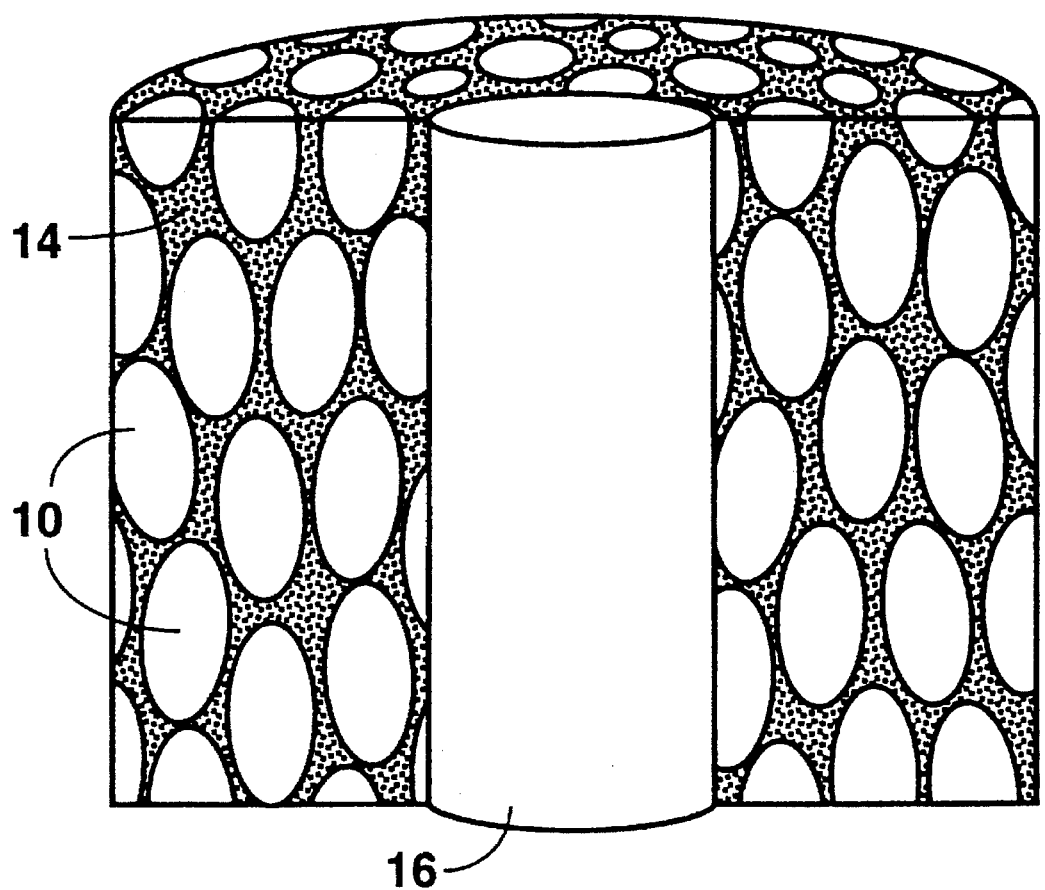
FIG. 2

FIG. 3
Stress Strain Curves for a Ceramic Composite made with Potassium Fluorophlogopite Coated Nicalon Fibers and Potassium Stuffed Cordierite
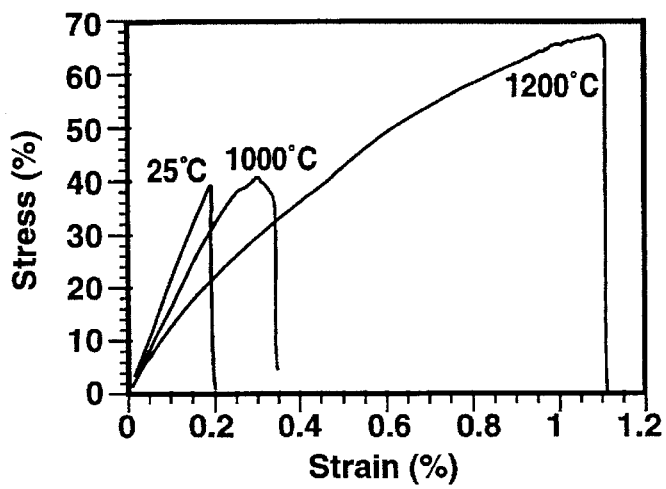
FIG. 4
Stress Strain Curves for a Ceramic Composite made with Niacalon Reinforced Barium Disilicic Mica Coated (10wt%) Barium Stuffed Cordierite
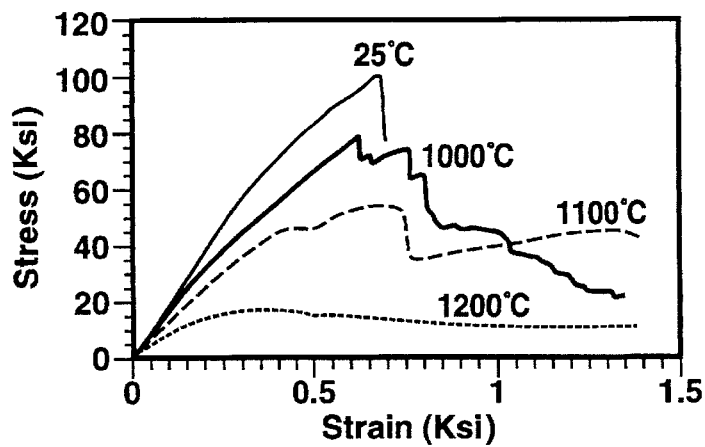
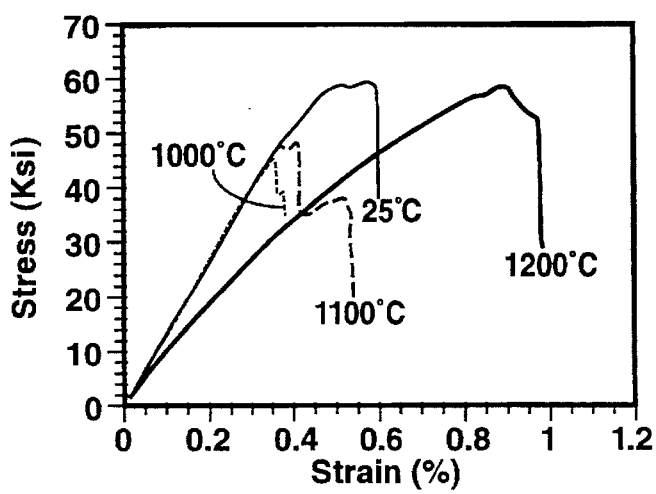
FIG. 5

FIBER-REINFORCED COMPOSITE WITH SHEET SILICATE INTERLAYER

BACKGROUND OF THE INVENTION

The present invention relates to ceramic composites, more particularly mica-containing ceramic matrix composite materials which are reinforced with inorganic fibers.

Ceramic fiber reinforced ceramic matrix composites consist of ceramic fibers supported in a matrix of ceramic material. Inorganic whiskers and fibers have heretofore been used to reinforce glass, glass-ceramic, and ceramic material. A further objective of fiber and whisker reinforcement in glass, ceramic and glass-ceramic materials is to increase the toughness of the material. To accomplish this, it is desirable that the fibers in such materials debond relatively easily from the matrix phase at the fiber/matrix interface. For example, in some desirable composite materials, the energy needed to cause a fracture at the fiber/composite interface is only a fraction of the energy needed to fracture the fiber. These materials typically exhibit crack deflection and fiber pullout properties which serve to greatly increase the toughness of the composite body. Such weak mechanical coupling of the fibers to the ceramic matrix has been accomplished using several methods. For example, U.S. Pat. Nos. 4,935,387 and 4,984,758 describe applying sol-gel coatings to inorganic fibers. The sol-gel coatings convert, during processing, of the composite, to mica materials. The mica-coated fibers are then incorporated into a composite material. This results in a mica interlayer, between the fiber and the matrix material, which imparts tough fracture behavior to the resultant composite material. However, this method does not provide a network of mica in the matrix phase, and therefore does not provide crack deflection in the matrix phase, which would also enhance matrix fracture toughness.

U.S. Pat. No. 5,132,253 discloses a method for synthesizing alkaline earth metal containing ceramic materials by sol-gel processing, and using these sol-gel materials to coat fibers, such as silicon carbide, in fiber reinforced ceramic composite materials.

Unfortunately, the fiber coating methods described in the patents above are generally expensive and not efficient for coating large numbers of fibers at a time. As a consequence, the thickness of the interlayer coatings on the fibers is typically non-uniform. In addition, many of the fibers become bridged, meaning that two fibers become joined together. During further processing that takes place during the manufacturing process, these bridges often break, leaving unexposed fiber sections. The end result is that, the fibers are uncoated in these regions, and there is no sheet silicate interlayer between the matrix particles and the fibers. In addition, these methods do not provide a network of mica in the matrix phase, and therefore can not provide crack deflection in the matrix phase which would otherwise further enhance matrix fracture toughness.

U.S. Pat. No. 5,132,256 discloses a method and composition in which a ceramic matrix composite article comprises reinforcing fibers such as silicon carbide fibers disposed within a ceramic matrix, characterized in that the ceramic matrix contains dispersed mica crystallites in a proportion ranging up to but not exceeding about 20% by weight. Mica powder particles and ceramic matrix powder particles of approximately equal size are mixed together. This powder mixture is then prepregged with a fiber reinforcement material. This results in a dispersion of mica crystallites, within the ceramic matrix, which provide sites for crack deflection in the matrix. This results in improved high temperature flexural strength of the composite because ingress of oxidizing environments to the fiber/matrix interlayer is minimized. However, because the mica is added as discrete particles of 10 microns in size, they remain in domains of relatively the same size after consolidation. As a result, there is no possibility of developing a continuous, extended mica network throughout the matrix. More importantly, the amount of mica present at the fiber/matrix interface is proportional to the volume fraction of mica. Consequently, this method typically results in no more than about 20% of the interface between the fiber and matrix being comprised of mica.

It would therefore be desirable to form a more composite interface comprised primarily as a mica phase by introducing the mica into the matrix in the form of a nearly continuous network throughout the matrix. Such a continuous network would promote increased strength via fiber debonding through the mica interfacial layer and subsequent pullout, rather than crack deflection in the matrix or other sheet silicate. In addition, to further promote fiber debonding through the mica and fiber pullout, it would be desirable to achieve a more uniform and continuous fiber/coating interlayer which is inherently oxidation resistant.

SUMMARY OF THE INVENTION

One aspect of the present invention relates to a method for making a ceramic matrix composite article. A ceramic, glass, or glass-ceramic particulate matrix precursor material is coated with sheet silicate crystals or a metal-organic precursor solution for such sheet silicate crystals. The coated matrix precursor particles are then combined with a fiber reinforcement material. The combination of matrix material and fibers is consolidated into a dense, fiber-reinforced composite material. A preferred method of coating the matrix particles is by spray drying, although other methods, such as sol-gel immersion coating methods, can be employed.

The primary matrix phase and the sheet silicate layer combine to form a two phase matrix wherein the primary or major phase is a glass, glass ceramic or a ceramic material, and the minor phase is a sol-gel derived sheet silicate. Because the sheet silicate phase is applied as a coating on the matrix particles, a sheet silicate microstructure exists in the boundaries between each matrix grain, and more importantly, between the matrix grains and reinforcing fibers.

The methods of the present invention result in a number of advantages. For example, because the precursor to the sheet silicate material is added directly to the surface of the matrix particles, forming a layer of sheet silicate crystals upon heating, the method of the present invention facilitates greater control over the amount of sheet silicate ending up in the matrix. Additionally, because the sheet silicate is provided as a coating on primary matrix phase particles, a nearly continuous network can form by simply consolidating adjacent coated particles.

The presence of the sheet silicate network provides two significant benefits to the composite. First, the sheet silicate within the matrix provides multiple crack paths, leading to fracture toughness improvements via crack deflection, and branching. Second, and more important, the adjoining surface of fibers within the matrix will consist primarily of sheet silicate. Thus, the continuous sheet silicate network will provide sheet silicate-rich fiber/matrix interface zones. Sheet silicate at the fiber/matrix interface provides an oxidation resistant interlayer that promotes fiber debonding and imparts fracture toughness to the composite material. Using the methods of the present invention, it is possible to achieve a fiber/sheet silicate interface in which more than 50 percent of the surface area of the fibers contact sheet silicate, rather than the ceramic matrix material. Preferably, at least 70 percent of the fiber surface area contacts sheet silicate material. Most preferably, at least 85 percent of the fiber surface area contacts sheet silicate material. At the same time, the sheet silicate coating on the ceramic matrix precursor powder results in a substantially continuous network of sheet silicate within the matrix itself. Excellent mechanical properties, which equal or exceed those achieved using fiber coated composites, have been obtained. High temperature strengths were also excellent, demonstrating superior resistance to oxidation embrittlement. At the same time, the costly and time consuming fiber coating processes are avoided.

To facilitate obtaining a substantially continuous sheet silicate network, it is preferable that the diameter of the sheet silicate powder particles be much smaller than the diameters of the matrix precursor powder particles. Preferably, the sheet silicate powder particles should be less than one third, more preferably less than one fifth, and most preferably less than one seventh the diameter of the matrix powder particles.

In a preferred embodiment of the invention, a sol-gel derived mica precursor is used to coat individual matrix particles with a relatively thin layer. This precursor layer, when appropriately thermally processed, converts to a mica or other sheet silicate phase, which remains largely as a thin layer around each original matrix grain. The particles consolidate to form a matrix consisting of a substantially continuous network of mica around discrete domains of the glass ceramic phase. Such a substantially continuous network can be made with very low fractions (2 to 20 weight percent, more preferably 5 to 15 weight percent) of mica.

BRIEF DESCRIPTION OF THE DRAWINGS

FIG. 1 is a schematic illustration of a method in accordance with the present invention.

FIG. 2 is a schematic illustration of a fiber reinforced composite material formed using the methods of the present invention.

FIG. 3 illustrates a stress/strain curve of a composite material made using methods of the prior art.

FIGS. 4 and 5 illustrate stress/strain curves for composite materials made using methods of the present invention.

DETAILED DESCRIPTION OF THE INVENTION

In the present invention, the advantageous cleavage behavior of suitable materials is incorporated into fiber reinforced ceramic, glass, or glass-ceramic matrix materials by coating the matrix precursor powder particles with these materials prior to forming the composite. In particular, a matrix precursor particulate material, such as a glass, glass ceramic or ceramic precursor material, is coated such that, after prepreg and consolidation with an inorganic fiber material, a substantially continuous network of the interlayer coating is present within the matrix between matrix particles and between the matrix material and the fiber material. The interlayer, which preferably is a sheet silicate or a precursor material of a sheet silicate, provides an oxidation resistant, functional interface between the fiber and matrix material. The weak shear behavior of a sheet silicate phase at the interlayer promotes crack deflection and fiber pullout, resulting in a strong and tough composite.

The sheet silicate coating may be applied using a variety of methods. For example, a slurry or solution which contains particles of a sheet silicate may be used to coat the matrix precursor particles (which may be glass, ceramic, or glass ceramic precursor particles).

More preferably, a sol comprised of a group of metal organic compounds in a solvent carrier, which together form a precursor for a sheet silicate material, is used to coat the matrix precursor particles, and then heated to result in a coated matrix precursor particulate material.

Alternatively, combinations of sheet silicate crystals and precursors for sheet silicate crystals may be employed in a carrier to coat the matrix precursor particles.

After conventional composite consolidation and firing schedules, the sheet silicate material becomes a secondary, or minor phase of the matrix material. It is preferred that the sheet silicate coating be relatively much thinner than the diameter of the primary matrix phase precursor particles. For example, the diameters of the primary matrix phase particles are preferably between about 1 to 25 microns, and most preferably between about 5 to 20 microns in diameter, and the coating on the matrix precursor particles is preferably about 0.01 to about 1.0 microns thick. In one preferred embodiment, the average particle size of the glass matrix particles is about 10 microns, and the sheet silicate coating is about 0.1–1.0 micron thick.

Thus, when a slurry of sheet silicate is used to form the coating, it is preferred that the particles of sheet silicate be much smaller than that of the matrix precursor particles, preferably less than one third, more preferably less than one fifth, and most preferably less than one seventh the diameter of these particles.

When sheet silicate precursor materials are used to apply the coating to the matrix precursor particles, it is preferred that the resulting coating be approximately 0.5 to 10 percent of the diameter of the matrix precursor particles, more preferably about 1 to 6 percent of the diameter of the matrix precursor particles.

These thickness calculations are based on the resultant weight percents of the coating material and matrix precursor material before and after processing. The methods of the present invention preferably result in a sheet silicate content, in the matrix portion (i.e., that portion other than the reinforcement fibers) of the composite material, between about 1 and 30 weight percent, more preferably about 5 to 15 weight percent.

In the method illustrated in FIG. 1, primary matrix phase precursor particles 10 are immersed into a solution 12 containing sheet silicate particles. Excess solvent is then removed by drying. The resultant material is then milled using conventional milling techniques. This process results in a secondary matrix precursor phase of sheet silicate coating 14 on the primary matrix phase precursor particles 10. It may be desirable to agitate or mix the particles during the drying process. This prevents the particles from settling out, and thereby facilitates a more uniform coating on the powder particles. The coated particles are incorporated into a fiber reinforced composite material and processed using conventional processing techniques and firing schedules.

FIG. 2 illustrates an enlarged cross-section of a resultant fiber reinforced composite material. As shown in FIG. 2, inorganic fiber 16 is surrounded by a two phase matrix wherein the primary phase 10 is a glass, ceramic, or glass-ceramic and the secondary phase 14 is a sheet silicate.

Because the sheet silicate phase is applied as a coating on the glass ceramic particles, after consolidation, a thin, substantially continuous distribution of sheet silicate material results around the primary glass ceramic phase in the resultant composite material. More importantly, as illustrated in FIG. 2, a substantially continuous interlayer of sheet silicate material exists between each fiber 16 and primary matrix phase 10. It should be noted that the high degree of order illustrated in FIG. 2 is not realistic. In fact, during consolidation operations, motion of the coated matrix particles within the carrier fluid leads some particles to adjoin with one another.

Nonetheless, the methods of the present invention generate an effective, oxidation resistant sheet silicate fiber/matrix interface, as well as a network of sheet silicate throughout the matrix itself. The presence of the sheet silicate network provides two significant benefits to the composite. First, the sheet silicate within the matrix provides multiple crack paths, leading to fracture toughness improvements via crack deflection, and branching. Second, and more important, the adjoining surface of fibers within the matrix will consist primarily of sheet silicate. Thus, the continuous sheet silicate network will provide sheet silicate-rich fiber/matrix interface zones. Sheet silicate at the fiber/matrix interface provides an oxidation resistant interlayer that promotes fiber debonding and imparts fracture toughness to the composite material. Using the methods of the present invention, it is possible to achieve a fiber/sheet silicate interface in which more than 50 percent of the surface area of the fibers contact sheet silicate, rather than the ceramic matrix material. Preferably, at least 70 percent of the fiber surface area contacts sheet silicate material. Most preferably, at least 85 percent of the fiber surface area contacts sheet silicate material. At the same time, the sheet silicate coating on the ceramic matrix precursor powder results in a substantially continuous network of sheet silicate within the matrix itself. Excellent mechanical properties, which equal or exceed those achieved using fiber coated composites, have been obtained. High temperature strengths were also excellent, demonstrating superior resistance to oxidation embrittlement. At the same time, the costly and time consuming fiber coating processes are avoided.

One beneficial mechanical property of the composites of the present invention is illustrated with reference to FIGS. 3 and 4. FIG. 3 illustrates a typical stress strain curve for a composite made using one of the methods of the prior art, namely, fiber coating. This composite employed a sol-gel derived potassium fluorophlogopite coated ® Nicalon reinforcement fibers dispersed within a matrix of potassium stuffed cordierite. Note that failure, strain increases with test temperature. Additionally, upon reaching the maximum catastrophic failure occurs.

In contrast, FIG. 4 illustrates a stress/strain curve for a composite formed in accordance with the present invention. Note that the composite exhibited values of ultimate load similar to that of FIG. 3, an effect due to mica at the fiber matrix interface. However, rather than failing catastrophically, the composites of the present invention show a gradual decrease in stress, or graceful failure mode at all test temperatures. Thus, FIG. 4 illustrates the benefit of having a mica network both at the interface, as evidenced by the constant strain value at maximum stress as a function of temperature, and in the matrix, as evidenced by the lack of catastrophic failure.

There are two preferred methods for coating the matrix precursor particles in accordance with the present invention. The first method, explained above with reference to FIG. 1, involves coating the primary matrix phase precursor particles by immersing and mixing the particles into a slurry containing either particles of sheet silicate material or precursor particles of a sheet silicate material. Excess solvent is then removed by drying, and the resultant material is then comminuted using conventional milling techniques.

The second and more preferred method involves coating the primary matrix phase precursor particles with such a slurry using a spray drying technique. In the spray drying technique, the slurry is converted to an aerosol, and solvent or carrier is removed by evaporation, leaving only dry, coated particles. A preferred medium for the slurry in either method is an alkoxide precursor sol.

Sol-Gel Immersion Coating Method

In the sol-gel slurry immersion coating technique, a sol is first prepared which consists of the desired sheet silicate material or precursors for the desired sheet silicate material, or a combination thereof. Glass ceramic precursor particles are immersed into the sol, and mechanically mixed together. The slurry of glass ceramic particles and sol is allowed to get, such as by solvent evaporation and coincident air hydrolysis. The resultant product is then heat treated to remove excess solvent and water, after which the product is reduced to a fine powder by grinding or milling. This powder is then used to form a polymer containing slurry for prepregging reinforcing fibers. Standard processing, such as by hot pressing, etc., can be used to form a dense composite material.

The sol-gel immersion coating method successfully results in coated powder particles. The incorporation of such coated powder particles into a fiber-reinforced composite material results in a stronger composite than was possible using prior art techniques. However, there are several drawbacks to the sol-gel immersion coating method. For example, the sol-gel method does not always result in the continuous or nearly continuous sheet silicate coating that is desired. In addition, gelation requires a relatively long time (days), and can induce inhomogeneities if particles happen to settle during gelation. Also, the grinding process typically used to reduce the particle size of the coated particles can sometimes damage the coating.

Spray Drying Method

In the preferred method of the invention, the powder precursor particles are introduced into a sol, as in the process described above. However, rather than coating the particles with sheet silicate by bulk gelation of the sol, a spray drying method is used to coat the particles, and to collect the heat treated product. While some subsequent heat treatment may be required after collection of the powder to eliminate residual solvent trapped in the gel coating, this can be done without causing the particles to agglomerate. The resultant product can then be introduced into a polymer containing slurry and composite fabrication can proceed using normal methods. The spray drying process has several benefits. Coated matrix particles are more rapidly prepared than was the case using other techniques, including the sol-gel immersion coating technique described above. The spray drying process affords a more uniformly coated, well dispersed powder with undamaged coating, in part because of the spray drying process itself, and also because of the elimination of the need for abrasive grinding techniques to reduce particle size. In fact, the original particle size distribution of the precursor matrix particles is in large part retained. This facilitates selection of optimum size particles for consolidation into the composite, especially compared to techniques which require grinding.

Preferred sheet silicate materials for use in the present invention include mica materials, particularly synthetic fluormicas. U.S. Pat. Nos. 4,935,387; 4,948,758; and 5,132,253, the specifications of which are hereby incorporated by reference, teach synthesizing fluormica phases using an oxide precursor consisting primarily of a non-aqueous organometallic sol, wherein the organometallic sol is convertible to synthetic fluormica crystals by heating. In the present invention, such organometallic sols are used to coat primary matrix phase particles, after which the particles are consolidated into a composition and the coating is converted to synthetic fluormica crystals by heating.

Although a variety of glass, ceramic, and glass-ceramic materials can be utilized to provide the matrix of the composite materials of the present invention, preferred materials include those selected from the group consisting of aluminosilicate glasses and alkaline earth aluminosilicate glass-ceramics. Most preferably, the matrix is an alkaline earth aluminosilicate glass-ceramic wherein the alkaline earth oxide is selected from the group consisting of BaO, CaO, SrO and MgO and wherein a crystalline species selected from the group consisting of anorthite, mixed anorthite/alumina, celsian, cordierite and stuffed cordierite comprises the predominant crystal phase. Predominant crystal phase means a crystal phase or phase group constituting more than 50% by volume of the glass-ceramic component, exclusive of the sheet silicate additive. Such glass-ceramic compositions are well known from the patent literature, and are discussed further, for example, in U.S. Pat. Nos., 4,615,987, 4,755,489 and 4,485,179, the specifications of which are hereby incorporated by reference.

The fibers used for composite reinforcement in accordance with the invention preferably are selected from any of the fibers known for use as ceramic matrix reinforcement fibers. Examples of such fibers include silicon carbide or silicon oxycarbide fibers as well as carbon, boron carbide, boron nitride, silicon nitride and silicon oxynitride fibers. Particularly preferred fiber reinforcement materials are selected from the group consisting of silicon carbide fiber and silicon oxycarbide fibers.

Silicon oxycarbide fibers are readily available commercially as Nicalon® or Tyranno® fiber. This continuous fiber tow or yarn may be conveniently impregnated with the selected matrix material and formed by winding or the like into fiber-reinforced prepreg sheet. The resulting sheets may then be stacked, heated to achieve burnout of any organic constituents, and finally treated to effect consolidation and crystallization thereof into a dense, substantially void-free glass-ceramic matrix composite material. Consolidation may be achieved by sintering, hot pressing, hot isostatic pressing, or similar known consolidation procedures.

The final properties of the particular fiber-reinforced ceramic matrix composites will depend upon a number of variables, including the matrix composition, the composition and thickness of the sheet silicate coating, the proportion of mica additive used, and the relative compatibility of the platelet and matrix glass-ceramic.

The following examples, which are intended to be illustrative rather than limiting, further demonstrate the fabrication of ceramic matrix composite articles in accordance with the invention.

EXAMPLE 1

In this example, a sol-gel immersion coating method is used to coat barium stuffed cordierite matrix powder particles with a barium disilicic mica precursor such that the mica phase constitutes 10% of the volume of the modified matrix.

Batch materials for the glass matrix are given below in Table I. The ingredients listed are in weight percents. The glass was melted at 1650° C. for 16 hours in a platinum crucible and drigaged into ⅛" glass granules by pouring the molten stream into cold water. The drigaged particles were comminuted into finer powder (average particle size=10 microns) by wet ball-milling in methanol.

TABLE 1

| | |
|---|---|
| BaO | 6.1 |
| MgO | 13.9 |
| $Al_2O_3$ | 36.7 |
| $SiO_2$ | 43.3 |
| $Nb_2O_5$ | 1.0 |
| $As_2O_3$ | 0.7 |

A barium disilicic mica [$BaMg_3(Al_2Si_2O_{10})F_2$; hereinafter BDM] precursor sol was prepared using a process similar to that disclosed in U.S. Pat. No. 5,132,253. In one flask, 5.97 grams of $Mg(OC_2H_5)_2$, 7.08 grams of $Al(OC_3H_7)_3$ and 7.8 ml $Si(OC_2H_5)_4$ were dissolved in 530 ml of 2-methoxyethanol and 30 ml HCl to form a clear sol after about one hour of stirring at 80° C. In another flask, 2.4 grams of barium metal were added to 60 ml of methanol, evolving hydrogen to form barium methoxide. The barium methoxide solution was added to the magnesium aluminum and silicon alkoxide sol in the first flask, forming a clear sol after stirring. 2.6 grams of 18-Crown-6 was then added to form a Ba(18-Crown-6) complex. This complexed cation is highly soluble in the presence of fluorides, and thereby prevents precipitation of $BaF_2$ in later stages of the synthesis. The resulting sol was clear and colorless.

In another flask, 1.35 grams of $NH_4F$. HF were dissolved in 150 ml of $CH_3OH$ and 7 ml of HCl. This solution was added to the alkoxide mixture to yield a clear sol after stirring. The reactant sol contained sufficient precursor material that 800 ml of the sol would yield about 10 grams of $BaMg_3(Al_2Si_2O_{10})F_2$.

To coat the glass-ceramic powder with the sol, 90 grams of the glass powder were added to the sol described above, with rapid stirring. The sol was then evaporated in air over the course of two days to yield a gel carrying a suspension of the powder. This gel/powder mixture was warmed to 60° C. for twelve hours, and then to 100° C. for 8 hours, to remove residual solvent. The mixture was agitated to make a fine powder. The powder was then heated to 300° C. for two hours, yielding a gray material. This material was ground in a mortar and pestle to yield a fine gray powder having an average particle size of about 10 microns.

Prepreg and Composite Fabrication

To impregnate a fiber tow with the coated glass-ceramic matrix powder, a slurry consisting of a solvent, a polyvinyl butyral (PVB) binder and the powder was used prepared having the following formulation:

| | |
|---|---|
| PVB (binder) | 133.4 g |
| coated matrix powder | 100.0 g |
| methanol (solvent) | 77.5 ml |
| dispersant | 0.5 ml |

The slurry had a viscosity of 57 cps, and had to be stirred to prevent settling of the glass particles. Silicon oxycarbide fiber was desized by pulling through an electric furnace set at 800° C., and then immersed in the slurry prior to winding onto a round drum to form a mat. The mat was dried in air after which it could be handled easily. The mat was cut into 1.5×3" plys and 12 such plys were stacked. The stack was then fired to 600° C. in air to burn out the binder. The stack was placed in a hot press and then subjected to a consolidation schedule having maximum temperatures of 1200° C. to 1250° C. (Examples 1A and 1B respectively) and pressures of 1500 psi.

Mechanical strength tests were done at a variety of temperatures (25°, 1000°, 1100° and 1200° C.). The results are listed in Table II. Also listed in Table II are typical mechanical results from two baseline composites for comparison; a barium stuffed cordierite (hereinafter BaMAS) matrix composite made with uncoated silicon oxycarbide fibers (Example 1C) and a barium disilicic mica matrix composite made with uncoated silicon oxycarbide fibers (Example 1D).

TABLE 2

EXAMPLE 1A
Uncoated Nicalon Fiber/BDM-Coated BaMAS
Hot pressed at 1206° C. Density 2.56 g/cc

| Temp C° | $\sigma_{el}$ (Ksi) | $\epsilon_{el}$ (%) | $\sigma_u$ (Ksi) | $\epsilon_u$ (%) | E (Msi) | Failure Mode |
|---|---|---|---|---|---|---|
| 25 | 16 | 0.06 | 87 | 0.52 | 28 | C, S; F |
| 1000 | 31 | 0.18 | 46 | 0.33 | 17 | T, S; W, f |
| 1100 | 32 | 0.24 | 48 | 0.39 | 13.5 | T, S; W |
| 1200 | 15 | 0.15 | 27 | 0.50 | 10 | S, Def |

EXAMPLE 1B
Uncoated Nicalon Fiber/BDM-Coated BAMAS
Hot pressed at 1258° C. Density 2.64 g/cc

| Temp C° | $\sigma_{el}$ (Ksi) | $\epsilon_{el}$ (%) | $\sigma_u$ (Ksi) | $\epsilon_u$ (%) | E (Msi) | Failure Mode |
|---|---|---|---|---|---|---|
| 25 | 36 | 0.16 | 104 | 0.72 | 24 | C, S; F |
| 1000 | 22 | 0.13 | 77 | 0.63 | 18 | T, S; W-F |
| 1100 | 17 | 0.11 | 56 | 0.69 | 17 | T, S; W-F |
| 1200 | 9 | 0.10 | 17 | 0.33 | 9.5 | S, Def |

EXAMPLE 1C (Comparative Example)
Uncoated fiber/BaMAS pressed 1250° C., density 2.64 g/cc.

| Temp | $\sigma_{el}$ (Ksi) | $\epsilon_{el}$ (%) | $\sigma_u$ (Ksi) | $\epsilon_u$ (%) | E (Msi) | Failure Mode |
|---|---|---|---|---|---|---|
| 25 | 30.5 | 0.15 | 142 | 0.98 | 21.0 | T; F |
| 1000 | 17.4 | 0.10 | 38.2 | 0.24 | 17.8 | T; B |
| 1200 | 13.0 | 0.09 | 35.9 | 0.28 | 14.8 | |

EXAMPLE 1D (Comparative Example)
Uncoated fiber/BDM pressed 1250° C., density = 3.2 g/cc

| Temp C° | $\sigma_{el}$ (Ksi) | $\epsilon_{el}$ (%) | $\sigma_u$ (Ksi) | $\epsilon_u$ (%) | E (Msi) | Failure Mode |
|---|---|---|---|---|---|---|
| 25 | 11 | 0.06 | 22 | 0.21 | 19 | C, S; F |
| 1000 | 13 | 0.12 | 24 | 0.41 | 16 | T, C, S; W, f |
| 1200 | 13 | 0.18 | 14 | 0.33 | 7 | S; def |

$\sigma_{el}$ - Stress ($\sigma$) at elastic limit (where stress/strain deviates from linear)
$\epsilon_{el}$ - Strain (%) at cracking yield point
$\sigma_u$ - Stress at ultimate strength point
$\epsilon_u$ - Strain at ultimate strength point
E - Failure modulus - calculated by $\sigma_{el}/\epsilon_{el}$ = E
Failure mode descriptions: T = Tensile; C = Compression; S = Shear; F = Fibrous; W = Woody; B = Brittle; def = deformed. Lower case letters signify attribute is minor component of failure mode or morphology.

The mechanical properties of composites 1B show strengths that decrease, with increasing temperature, from 104 Ksi at 25° C. to 77 Ksi at 1000° C. to 56 Ksi at 1100° C., with nearly constant ultimate strains over the range of temperatures.

Composites made with only a mica matrix have shown very low strengths (as illustrated in example 1D, 20 Ksi for the barium disilicic mica matrix composites, and up to 40 Ksi in potassium phlogopite mica $[KMg_3(AlSi_3O_{10})F_2]$ matrix composites) over the entire temperature range of 25° C. to 1100° C. due to low resistance to shear failure in the matrix. Uncoated BaMAS composite with no fiber coating can give high strength and failure strain at room temperature if processed such that an in-situ carbon layer forms, but show severe degradation of strength at high temperature. Clearly, the effect of the mica coated matrix is to both resist shear failure so that the fiber is loaded during flexure (as indicated by the high strength compared to the mica matrix composite) and to provide a functional interface over the temperature range of 25° C. to 1200° C. (as opposed to the embrittlement observed in uncoated silicon oxycarbide/ BaMAS of example 1C), as demonstrated by high values of failure strain.

The failure mode of the BDM coated matrix composite was primarily shear at all temperatures. In the denser of the two composites (Example 1B), significant loading of the fibers was achieved to 1100° C. as demonstrated by the high strengths. The predominant shear failure is an important component of the toughness of the materials, indicating the weak shear property of a mica like interface. Even at 1200° C., the weak properties are due to shear failure rather than embrittlement. In the less dense composite (Example 1A) low strengths are probably due to inability to load the fibers through a combination of matrix porosity and weak shear.

EXAMPLE 2

In this example, spray drying is used to coat glass ceramic matrix powder particles with a mica coating. 11.4 grams of a glass ceramic powder (composition: 0.25 BaO2 MGO.2.75 $Al_2O_3$.4.5 $SiO_2$, average particle size 10 microns) was stirred into 50 ml of a sol comprised of $Ba(OCH_3)_2$, $Mg(OC_2H_5)_2$, $Al(OC_3H_7)_3$, $Si(OC_2H_5)_4$, 18-Crown-6, and $NH_4F$. HF in 2-methoxyethanol, methanol and HCl. The sol was formulated in the same manner as described in the above example, except that the concentration of the alkoxides, 18-crown-6 and $NH_4F$. HF was doubled. Thus, the formulation of the slurry produced a mass ratio of 11% mica (1.25 g) to 85% glass ceramic (11.4 grams). A second slurry was prepared in which 30 grams of glass powder were added to 50 ml of the same sol. In this case the mass ratio was 4% mica and 96% glass.

The slurries were spray dried in a Buchi Model No. 190 Mini Spray Dryer manufactured by Buchi Laboratoriums—Technik A.G. of Germany. This equipment pumps a small volume (50 to 100 ml per hour) through a small nozzle in an air jet. The nozzle is heated to about 125° C. and a warm air stream (85° C.) carries the slurry droplets into a collector jar. The droplets rapidly dry and are collected at 150° C. as a dry powder. Yields of roughly 75 to 80% (yield=mass of the coated particles divided by the total of the starting mass of the glass and the mica) were obtained. The resultant powder was fired to 1000° C. This temperature is above where both the gel to mica and the glass to ceramic transitions occur.

The process of Example 2 resulted in a glass matrix powder coated with a layer of sheet silicate. Upon being consolidated with suitable fiber reinforcement material using conventional consolidation and firing schedules, such coated powder would result in a substantially continuous interlayer between the fibers and the primary matrix phase material.

EXAMPLE 3

This example further illustrates the spray dry coating techniques. 10 weight percent barium disilicic mica (BDM)

coated barium stuffed cordierite (BaMAS) matrix is produced using the spray drying method. The resultant coated matrix precursor material is then used to form a fiber reinforced composite material.

135 grams of powdered BaMAS glass were stirred into 400 ml of BDM sol formulated to provide 15 grams of barium silicate mica. This slurry was spray dried and collected as a loose powder. The powder was baked at 300° C. to remove the solvent. 132 grams of powder were recovered (86% yield). A prepreg slurry was made from the powder by mixing 132 grams of the BDM coated BaMAS powder with 176 grams of a toluene base PVB binder, 124 ml of methanol and 0.6 grams of a dispersant. This mixture was rolled overnight with a small charge of zirconia balls (sufficient to separate agglomerates but not mill the particles). A composite was made by prepregging silicon oxycarbide fiber with the mica coated glass slurry. The resultant composite was dense and well consolidated. Mechanical properties for the samples are given below in Table 3:

TABLE 3

Example 3: Hot pressed at 1258° C. Density 2.64 g/cc

| Temp | $\sigma_{el}$ | $\epsilon_{el}$ | $\sigma_u$ | $\epsilon_u$ | E | Mode |
| --- | --- | --- | --- | --- | --- | --- |
| 25 | 46 | 0.26 | 85 | 0.52 | 18 | T, C, S; F |
| 1000 | 33 | 0.24 | 59 | 0.44 | 14 | T, S, Delam; W |
| 1100 | 33 | 0.24 | 61 | 0.51 | 14 | T, S, Delam; W-f |
| 1200 | 28 | 0.49 | 33 | 0.70 | 6 | S, Delam, Def |

Good strength and toughness were observed at room temperature and at elevated temperatures. Stress strain curves revealed a non-catastrophic stepwise failure typical of a tensile/delamination failure, in which successive plys are loaded to failure. Shear failures dominated the fracture surfaces of tested bars. These observations indicate a substantial deviation from the comparative example in Example 1C, which was strong at room temperature due to the presence of a carbon layer, but which embrittled at higher test temperatures due to oxidation of the carbon. Some of the tendency to shear failure in the MCM was promoted by the microstructure of the composite which featured matrix rich zones between ply laminae. The sample deformed in 1200° C. tests, in part due to interlaminar shear, and in part due to matrix softening.

EXAMPLE 4

This example further illustrates the spray drying coating technique. Additionally this example shows that the resultant coated particles can be prepregged using slurries formulated with thermoplastic binder, as opposed to the PVB binder of the previous examples.

A batch of barium stuffed cordierite glass precursor particles was coated by spray drying with a sol containing the precursor for barium disilicic mica, as described in the previous two examples. The resulting powder was dispersed into toluene, and mixed with a thermoplastic binder Kraton G-1650 manufactured by Shell Chemical Company, at a temperature of 150° C. The thermoplastic binder system consists of a mixture of a thermoplastic polymer and several hydrocarbon waxes. The binder system becomes fluid at temperatures above 80° C., but solidifies to a flexible blend when cooled to room temperature. The mixed slurry contained 50% by weight mica coated glass, 40% wax and 10% thermoplastic binder. To prepreg uncoated fiber, the slurry was heated to 150° C. Nicalon yarn was prepregged by drawing the yarn through the slurry. The fiber to glass ratio was controlled by drawing the prepregged fiber though a circular stainless steel die whose diameter varied from 0.2 to 0.6 mm to strip away excess slurry. The fiber was wound onto a round drum to form a mat. The mat was cut to size, stacked, burned out and consolidated as in prior examples. The primary advantages of this prepreg method is that the glass to fiber ratio can be better controlled, and the distribution of the fiber in the matrix is more uniform then with polyvinyl butyral based binders.

Mechanical properties for the composite, which was consolidated at 1150° C., are given in Table 4. Stress strain curves are also shown in FIG. 5. The flexural strength varied little at 25° C. and 1200° C., while the 1000° C. test temperatures showed a reduction in strength from 59 to 46 Ksi, the stress strain curves show that the test specimens did not fail catastrophically, but rather in stepwise tensile delamination mode. This result is not optimal compared to the results in Example 1B, but shows significant departure from the brittle high temperature behavior shown in the baseline samples of Example 1C and 1D.

TABLE 4

Uncoated Nicolan Fiber Reinforced BDM coated BaMAS
Example 4: Hot pressed at 1150° C. Density 2.59 g/cc

| Temp | $\sigma_{el}$ | $\epsilon_{el}$ | $\sigma_u$ | $\epsilon_u$ | E |
| --- | --- | --- | --- | --- | --- |
| 25 | 51 | 0.33 | 59 | 0.44 | 15 |
| 1000 | 41 | 0.30 | 46 | 0.37 | 14 |
| 1200 | 22 | 0.23 | 59 | 0.90 | 9 |

EXAMPLE 5

This example further illustrates the spray drying technique. Additionally this example shows that the range of compositions employed in this invention is not limited to the aforementioned matrix and mica compositions. The compositions of the glass which forms the majority of the matrix phase in this example is a potassium stuffed cordierite (KMAS, nominal composition 0.25 $K_2O \cdot 2MgO \cdot 2.25 Al_2O_3 \cdot 4.5SiO_2$). The composition of the mica coating which comprises the minority of the matrix phase, and which adjoins the surfaces of the fiber, is a potassium fluorophlogopite (KFP, composition $KMg_3(AlSi_3O_{10})F_2$). The fiber employed was Tyranno® (Ube Industries), a silicon carbide fiber containing oxygen and a small amount of titanium.

The preparation of sol-gel precursors for potassium phlogopite was taught in U.S. Pat. No. 4,935,387, the specification of which is hereby incorporated by reference. A sol containing 2.50 grams of $K(OCH_3)$, 12.22 grams of $Mg(OC_2H_5)_2$, 7.27 grams of $Al(OC_3H_7)_3$, and 24.0 ml of $Si(OC_2H_5)_4$ was stirred and heated to dissolve in 650 ml 2-methoxyethanol and 35 ml HCl. 2.64 grams of $NH_4F$. HF were independently dissolved in 90 ml of methanol and 5 ml HCl. The fluoride solution was added to the alkoxide sol and stirred under reflux for 0.5 hours. The resulting sol (800 ml) contained precursor sufficient to make 15 grams of mica of composition $KMg_3AlSi_3O_{10}F_2$. After cooling, 135 grams of potassium cordierite glass powder was stirred into the sol. The resulting slurry was formulated to provide a powder containing 90% cordierite and 10% mica. The slurry was spray dried in the Buchi spray dryer described in Example 2, and collected at 150° C. The powder was baked at 350° C. to remove all traces of solvent. The powder (115 grams) was stirred overnight with 113 ml methanol, and 153.4 grams of a toluene based PVB solution, and 0.5 grams of a dispersant to make a slurry for prepregging.

The coated glass powders were mixed into a slurry and prepregged with Tyranno fiber, again as in Examples 3 and 4. A composite was consolidated from this combination of KFP coated KMAS. The flexural results are given in Table 5. Again, very little variation was observed in the flexural properties over the temperature range of 25° C. to 1100° C. The 1200° C. test indicated that the matrix phase was deforming.

TABLE 5

Uncoated Tyranno Fiber Reinforced KFP coated KMAS
Example 5: Pressed at 1150° C. Density 2.47 g/cc (10% mica)

| Temp | $\sigma_{el}$ | $\epsilon_{el}$ | $\sigma_u$ | $\epsilon_u$ | E |
| --- | --- | --- | --- | --- | --- |
| 25 | 42 | 0.25 | 61 | 0.36 | 17 |
| 1000 | 39 | 0.25 | 51 | 0.35 | 15 |
| 1100 | 32 | 0.21 | 62 | 0.51 | 14 |
| 1200 | 18 | 0.14 | 41 | 0.66 | 7 |

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method for making a fiber reinforced matrix composite article comprising:
   providing a particulate matrix precursor material;
   coating said particulate matrix precursor material with sheet silicate crystals, or a precursor for sheet silicate crystals, to form a coated particulate material;
   combining the coated particulate material with a fiber reinforcement material; and
   consolidating the combination of coated particulate material and fiber material into a fiber-reinforced composite material comprising a sheet silicate phase dispersed within the matrix.

2. The method of claim 1, wherein said coating step comprises coating said particulate matrix material by spray drying.

3. The method of claim 1, wherein said coating step comprises:
   applying, to said particulate matrix material, a slurry comprised of a carrier liquid and particles of sheet silicate crystals, said particles in said slurry having an average particle diameter which is less than one third of the average particle diameter of said particulate matrix material.

4. The method of claim 1, wherein said coating step comprises:
   applying, to said particulate matrix material, a solution containing metalorganic compounds which form a precursor for sheet silicate crystals.

5. The method of claim 3, wherein said applying step comprises immersing said particulate matrix material into said slurry;
   evaporating said carrier liquid to form a dry solid; and
   comminuting said dry solid.

6. The method of claim 4, wherein said applying step comprises immersing said particulate matrix material into said solution;
   evaporating said carrier liquid to form a dry solid; and
   comminuting said dry solid.

7. The method of claim 3, wherein said applying step comprises applying said slurry to said particulate matrix material by spray drying.

8. The method of claim 4, wherein said applying step comprises applying said solution to said particulate matrix material by spray drying.

9. The method of claim 3, wherein the average particle size of said particulate matrix material is between 1 and 25 microns, and said particles in said slurry are between 0.01 and 1.0 microns in diameter.

10. The method of claim 1, wherein said coating step comprises coating said particulate matrix material with particles selected from the group consisting of synthetic fluormica sheet silicate crystals and precursors of synthetic fluormica sheet silicate crystals.

11. The method of claim 3, wherein said coating step comprises coating said particulate matrix material with particles consisting essentially of synthetic fluormica sheet silicate crystals.

12. The method of claim 4, wherein said coating step comprises coating said particulate matrix material with particles consisting essentially of precursors of synthetic fluormica sheet silicate crystals.

13. The method of claim 4, wherein said coating step comprises coating said particulate precursor material with an oxide precursor for sheet silicate crystals, wherein the oxide precursor consists essentially of a non-aqueous metal-organic sol, and the metal-organic sol is convertible to synthetic fluormica crystals by heating.

14. The method of claim 13, wherein the non-aqueous metal-organic sol comprises a combination of metal alkoxides of metal selected from the group consisting of silicon, aluminum, boron, alkali metals, and alkaline earth metals.

15. The method of claim 4, wherein said precursor comprises an oxide precursor of the sheet silicate crystals, wherein the oxide precursor consists essentially of a glass powder and wherein the glass powder is convertible to a synthetic fluormica glass-ceramic by heating.

16. The method of claim 1, wherein said combining step comprises combining the coated particulate material with a fiber reinforcement material selected from the group consisting of silicon oxycarbide, silicon carbide, carbon, boron carbide, boron nitride, silicon nitride and silicon oxynitride.

17. A ceramic matrix composite article comprising:
   a matrix phase;
   an inorganic fiber reinforcement phase; and
   a sheet silicate phase disposed within said matrix phase, said sheet silicate phase comprising a substantially continuous network throughout said matrix phase and contacting at least 40 percent of the surface area of said fiber reinforcement phase.

18. The ceramic matrix composite as set forth in claim 17, wherein the matrix phase is a ceramic material.

19. The ceramic matrix composite as set forth in claim 17, wherein the matrix phase is selected from the group consisting of glass and glass-ceramic materials.

* * * * *